June 25, 1935.  A. L. NELSON  2,006,008
PISTON
Filed June 5, 1923
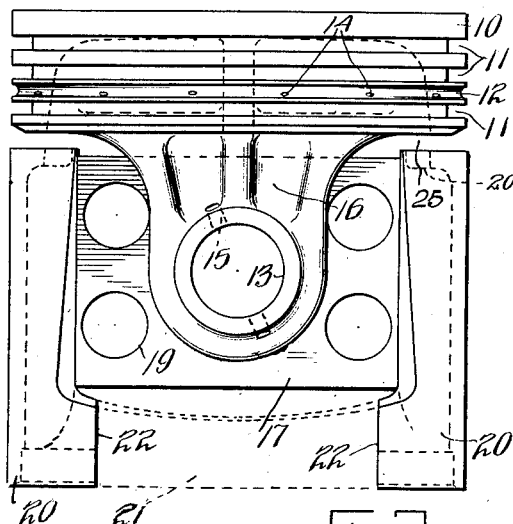
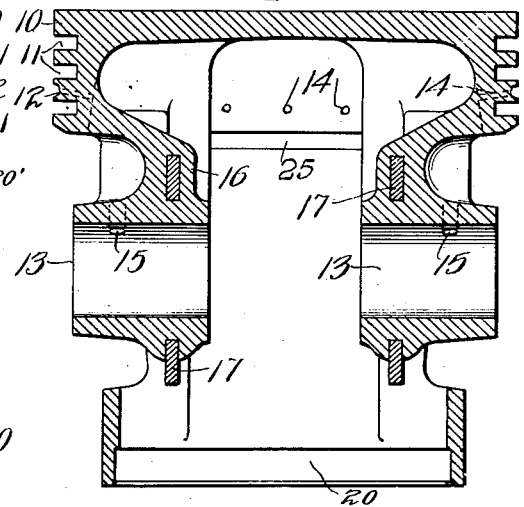
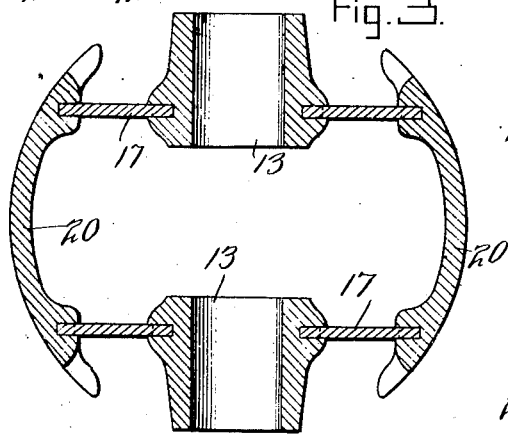
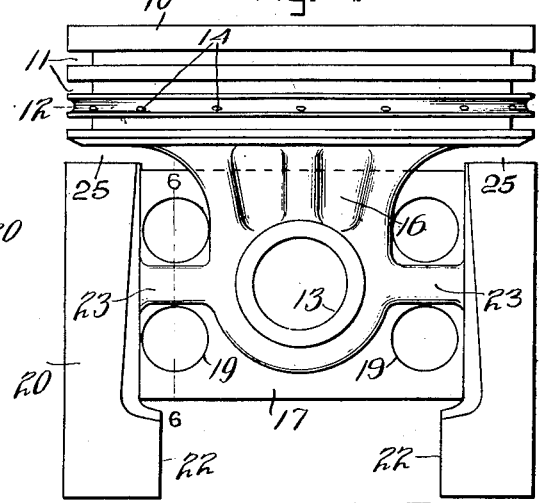
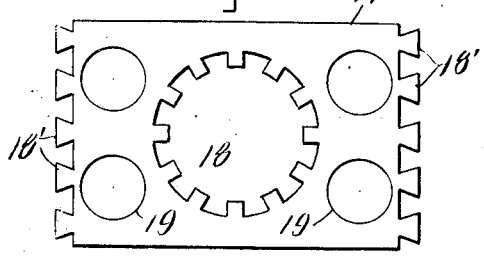
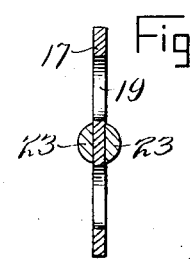
Inventor
Adolph L. Nelson
By
Attorney

Patented June 25, 1935

2,006,008

UNITED STATES PATENT OFFICE 2,006,008

PISTON

Adolph L. Nelson, Indianapolis, Ind., assignor to Bohn Aluminum & Brass Corporation, Detroit, Mich.

Application June 5, 1923, Serial No. 643,499

15 Claims. (Cl. 309—13)

My said invention relates to a piston and it is an object of the invention to provide an improved device of this character with a sectional skirt of material suitable for pistons which generally has a large co-efficient of expansion, the sections of the skirt being supported by material having a co-efficient of expansion suitable for controlling the clearance of the piston in the cylinder as desired. The supporting parts or elements preferably extend in a plane or planes at right angles to the line of the piston pin and thereby the expansion of the sections or aprons of the skirt may occur mainly along circumferential lines rather than diametrically of the piston. In other words the material of the skirt sections or aprons crawls about the wall of the cylinder in opposite directions instead of moving only out toward the cylinder wall on lines extending diametrically of the piston. The material of the piston for engines of some types is preferably aluminum alloy while the struts or supporting members for the aprons are preferably in the form of steel stampings.

Another object of the invention is to provide means for preventing the pumping of oil past the piston into the cylinder.

Referring to the accompanying drawing, which is made a part hereof and on which similar reference characters indicate similar parts, Figure 1 is a side elevation of my improved piston, Figure 2 a central section through the axis of the piston pin, Figure 3 a similar horizontal section, Figure 4 an elevation of a modified form of the invention, Figure 5 a detail of a strut, Figure 6 a vertical section on line 6—6 of Figure 4, and Figure 7 a horizontal section of another modified form.

In the drawing reference character 10 indicates the head of a piston having ring grooves 11 and a shallow groove 12 above the lowermost ring groove. The head is hollow and has integral therewith bosses 13 with piston pin bearings therein. Passages 14 connect the hollow interior of the head with the bottom of the groove 12 and these passages serve to break the suction (on the suction stroke of the piston) thereby to prevent the pumping of oil past the packing ring in the lowermost ring groove. The piston pin bearings have oil passages 15 leading thereto at or adjacent the upper and lower sides of the same and are connected to the head by necks 16.

Each of the piston pin bearings supports a strut 17 the structure of which is shown in detail in Figure 5. Preferably the struts are stamped out of sheet steel and have a central opening into which a number of tongues 18 extend, these tongues serving to permit the metal to shrink tightly on each tongue while the boss contracts in diameter on cooling. At its opposite ends each strut has a plurality of dovetails 18' by means of which it is firmly connected to aprons or clipper portions 20 which form the thrust faces of the piston. Preferably also the struts have a plurality of apertures 19 in the positions indicated. It will be seen that in the finished form of the piston the two aprons and the head are entirely separate from each other being connected only by the struts. In casting the piston the skirt is usually made in one piece with the head and remains so until after the outer periphery of the skirt has been machined and parted from the head by machining the slots at 25 after which the parts indicated in dotted lines at 21 in Figure 1 are removed by saw cuts along lines 22.

In a preferred form of the invention, ribs 20' are provided at the upper end of the skirt by forming this part of greater thickness as by extending the thick metal of the piston head for some distance below the point of slots 25. When the slots 25 are formed, as by means of saw cuts separating the head from the skirt, the curved ribs 20' will be left as clearly indicated in Fig. 1 and these ribs will greatly strengthen the skirt whether the same is in the form of sections, as here shown, or of other shape. One advantage of this method of forming ribs on the skirt is that it avoids any necessity for the use of cores made up in additional sections, such cores being usually made of steel and being highly expensive.

The head 10 and the aprons 20 are made of an alloy of aluminum or some other material. Usually the struts are independent pieces made of steel or like material having a small co-efficient of expansion, the purpose of this being to provide a relatively small diametrical expansion in a direction at right angles to the axis of the piston pin whereas the separated aprons permit circumferential expansion, the metal of the aprons having a sort of crawling action about the cylinder whereby it is possible to make the aprons fit closely in the cylinder when cold without causing the piston to bind in the cylinder as it becomes heated.

The diametral expansion of the piston is controlled in three ways independent of the metal in the piston skirt. First by the coefficient of expansion in the struts, as given above, second by the distance the struts are placed apart, and third by the shape of the struts as for instance 17' in Fig. 7.

The closer the struts are placed to each other the less will be the diametral expansion of the piston, such expansion being proportionately decreased since the crawling action between points 24, Fig. 7 will be less thereby bringing the ends of the struts adjacent to the cylinder very little nearer to the cylinder walls at these points.

With struts of the shape illustrated at 17', as the piston head by expansion carries the struts outwardly along the axis of the piston pin bearings the struts are flexed (at the ends) towards the center of the piston which action also brings the aprons of the skirt towards the center of the piston decreasing the diametral expansion of the piston when heated.

It may be desirable in some cases to strengthen the connection between the bosses forming the piston pin bearings and the aprons or the cylinder portion of the skirt and this may be done as shown in Figures 4 and 6 by forming members 23 of the metal in casting. The members 23 form ridges or ties which extend from the bosses to the parts of the thrust faces immediately adjacent to the ends of the struts. The members 23 are homogeneous with the bosses and the thrust faces and may be on one or both sides of each strut. In case ridges are made of sufficient strength the dovetails and tongues of the struts may be omitted thus simplifying the design of the struts.

In some instances where the piston pin bearings are short, as illustrated at 13' in Figure 7, it may be desirable to bend the struts as shown at 17'. They may be bent either in arcuate form or of a form to suit any individual design as for instance the form illustrated in Figure 7. An advantage of such a shape is that it shortens the distance between the points of connection of the struts with the apron at 24 and so permits sidewise expansion of the material of the aprons with less spreading of the struts than in the other forms described.

In forming the piston the piston pin bearings and the skirt are cast so as to envelop the struts in the relation shown in Figure 4. It will be evident that the metal of the bosses, the ridges and the skirt on cooling will shrink in such a manner as to be under high tension on the struts even at temperatures such as those obtaining in the engine under working conditions, i. e. ridges 23 and piston pin bearings 13 will not expand to such an extent as to tend to part the aprons from the ends of the strut adjacent the wall of the cylinder.

It will be obvious to those skilled in the art that various changes may be made in the construction of my device without departing from the scope of the invention and therefore I do not limit myself to what is shown in the drawing and described in the specification but only as indicated in the appended claims.

The projections 18 and 18' carried by the struts are claimed in my co-pending application Ser. No. 278,026.

Having thus fully described my said invention, what I claim as new and desire to secure by Letters Patent, is:

1. In a piston, a sectional skirt, a head separate therefrom, piston pin bearings integral with the head, struts uniting the sections of the skirt to each other and to the piston pin bearings, and integral ridges running from the piston pin bearings to the sections of the skirt said ridges extending along at least one side of each strut, substantially as set forth.

2. In a piston, a sectional skirt having arcuate sections, a head separate therefrom, struts uniting the arcuate sections of the skirt to each other, and integral ridges running from one section of the skirt to the other said ridges extending along at least one side of each strut, substantially as set forth.

3. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, and a tie extending laterally from each pin boss to each thrust face, each tie being homogeneous with a pin boss and with a thrust face.

4. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, the struts being in the form of flat plates and extending vertically from near the upper ends of the thrust faces to points below the pin bosses, and a tie extending laterally from each pin boss to each thrust face, each tie being homogeneous with a pin boss and with a thrust face and being in direct contact with a strut throughout the entire length of the tie.

5. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, and a tie extending laterally from each pin boss to each thrust face, on each side of each strut, each tie being homogeneous with a pin boss and with a thrust face.

6. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, the struts being in the form of flat plates and extending vertically from near the upper ends of the thrust faces to points below the pin bosses, and a pair of ties extending laterally from each pin boss to each thrust face, one tie of each pair extending along the inside of a strut and the other tie of each pair extending along the outside of a strut, each tie being homogeneous with a pin boss and with a thrust face and being in direct contact with a strut throughout the entire length of the tie.

7. A piston having a head, piers depending from the head, piston pin bearings formed in the piers, cylinder-bearing portions on opposite sides of the piston, a pair of chordal struts, each of said struts extending between the cylinder-bearing portions, the intermediate portion of each strut being surrounded by the material of a pier, there being an integral connection between each of the cylinder-bearing portions and each pier, said integral connection being in addition to the struts and being continuous and homogeneous with the cylinder-bearing portions and the piers, said integral connections extending outward laterally from each pin boss to each thrust face.

8. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other, and members extending laterally from the sides of the pin bosses to the thrust faces, each of said lateral members being integral and homogeneous with a pier and with a thrust face.

9. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other and having parts effective adjacent the upper ends of the thrust faces and parts effective below the pin bosses, and members extending laterally from the sides of the pin bosses to the thrust faces, each of said lateral members being integral and homogeneous with a pier and with a thrust face.

10. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other and being in the form of thin plates extending vertically from near the upper ends of the thrust faces to points below the pin bosses, and members extending laterally from the sides of the pin bosses to the thrust faces, each of said lateral members being integral and homogeneous with a pier and with a thrust face.

11. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, and a tie extending laterally from each pin boss to each thrust face, each tie being homogeneous with a pin boss and with a thrust face, and being located outside of a strut.

12. A piston comprising a head, piers depending from the head and carrying piston pin bosses, a pair of thrust faces formed of light-weight material, a pair of chordal struts of material different from the material of the thrust faces, the opposite ends of each strut being anchored to opposite thrust faces, respectively, the struts being in the form of flat plates and extending vertically from near the upper ends of the thrust faces to points below the pin bosses, and a tie extending laterally from each pin boss to each thrust face, each tie being homogeneous with a pin boss and with a thrust face and being in direct contact with the outside of a strut throughout the entire length of the tie.

13. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other, and members extending laterally from the sides of the pin bosses to the thrust faces, each of said lateral members being integral and homogeneous with a pier and with a thrust face and being located outside of a strut.

14. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other and having parts effective adjacent the upper ends of the thrust faces and parts effective below the pin bosses, and members extending laterally from the sides of the pin bosses to the thrust faces, each of said lateral members being integral and homogeneous with a pier and with a thrust face and being located outside of a strut.

15. A piston comprising a head, piers depending vertically from the head and carrying piston pin bosses, a pair of thrust faces, the head, piers and thrust faces being formed of light-weight material having a relatively high rate of thermal expansion, a pair of struts of material having a lower rate of thermal expansion than the material of the thrust faces, the struts extending transversely of the axis of the piston pin bosses from one thrust face to the other and being in the form of thin plates extending vertically from near the upper ends of the thrust faces to points below the pin bosses, and members extending laterally from the sides of the pin bosses to the thrust faces, each of said lateral members being integral and homogeneous with a pier and with a thrust face and being located outside of a strut.

ADOLPH L. NELSON.